United States Patent [19]

Obligin et al.

[11] Patent Number: 4,866,132

[45] Date of Patent: Sep. 12, 1989

[54] NOVEL RADIOPAQUE BARIUM POLYMER COMPLEXES, COMPOSITIONS OF MATTER AND ARTICLES PREPARED THEREFROM

[75] Inventors: Alan Obligin, Catonsville, Md.; Du W. Xia, Chengdu Sichuan, China; Ruth Silberman-Hazony, Brookline; H. Ralph Rawls, Boston, both of Mass.; Israel Cabasso, Syracuse; Johannes Smid, Lafayette, both of N.Y.

[73] Assignee: The Research Foundation of State University of New York, Albany, N.Y.

[21] Appl. No.: 852,990

[22] Filed: Apr. 17, 1986

[51] Int. Cl.$^4$ ................................................ C08F 8/00
[52] U.S. Cl. ............................... 525/107; 525/328.8; 525/474; 525/476
[58] Field of Search .................. 525/107, 328.8, 474, 525/476

[56] References Cited

PUBLICATIONS

Novel Polymer-Salt Complexes for X-Ray Diagnostics by D. W. Xia et al, Paper presented at American Chemical Society Meeting (ACS) Miami, FL., Apr. 28, 1985, Published as an ACS Polymer Preprint, Apr. 9, 1985.
ACS—Abstract of Papers, Polymer Section, Abstract #17, "Novel Polymer-Salt Complexes for X-Ray Diagnostics", by Xia et al., Apr. 1, 1985.
Journal of American Dental Assoc. (JADA), vol. 102, pp. 347-349, (Mar. 1981).
Journal of Prosthetic Dentistry, pp. 363-368, (Oct. 1972).
Chandler et al., Journal of Biomedical Materials Research, vol. 5, pp. 245-252, (1971).
Chandler et al, Journal of Biomedical Materials Research, vol. 5, pp. 253-265, (1971).
Chandler et al, Journal of Dental Research, vol. 52, No. 5, pp. 1128-1137, Sep.-Oct., 1973.
Chandler et al., Journal of Biomedical Materials Research, vol. 5, pp. 353-357, (1971).
Chandler et al., Journal of Biomedical Materials Research, vol. 5, pp. 359-371, (1971).
Chandler et al., (VI), JADA, vol. 81, pp. 935-940, (1970).
Bowen et al., (I), Journal of Dental Research, pp. 79-81, (1969).
Bowen et al., (II), Journal of Dental Research, vol. 51, pp. 177-182, (1972).
Combe, British Dental Journal, pp. 355-358, (Oct. 21, 1969).
Combe, Journal of Dental Research, p. 668, (May-Jun., 1971).
Combe, The Dental Practitioner, pp. 51-54, (1971).
Combe, Journal of Dentistry, vol. 1, pp. 93-97, (1972).
Beech et al., Journal of Dental Research-Supplement, vol. 50, p. 1192, (1971).
Alvares, O. S., O. M. and O. P., vol. 22, No. 3, pp. 318-324, (1966).
Elzay et al., Journal of Prosthetic Dentistry, pp. 251-257, (Mar., 1971).
McCabe et al., Journal of Dentistry, vol. 5, pp. 211-217, (1976).
Du Wei Xia et al., (I), Journal of Polymer Science, Polymer Letters Ed., vol. 22, pp. 617-621, (1984).
Takaki et al., Journal of the American Chemical Society, 96, pp. 2588-2593, (1974).
Du Wei Xia et al (II), Solid State Lomes, vol. 14, pp. 221-224, (1984).

*Primary Examiner*—Joseph L. Schofer
*Assistant Examiner*—Bernard Lipman
*Attorney, Agent, or Firm*—Howard M. Ellis; Michael L. Dunn

[57] ABSTRACT

Radiopaque polymeric materials comprising halogenated barium salts, homogeneously distributed at the molecular level, provide permanent, nonleachable radiopacities at least equivalent to pure aluminum without adversely affecting mechanical or physical properties of compositions in which they are employed.

17 Claims, No Drawings

NOVEL RADIOPAQUE BARIUM POLYMER COMPLEXES, COMPOSITIONS OF MATTER AND ARTICLES PREPARED THEREFROM

This invention was made with Government support under Grant Contract NIH 5R01-DE 06179-01A1. The Government has certain rights in this invention.

BACKGROUND OF THE INVENTION

The present invention relates to new and useful polymers, and more specifically, to improved nonleachable, optically transparent, radiopaque barium-containing polymer complexes, compositions of matter and articles made therefrom.

Translucent polymeric materials, and particularly, acrylic type resins have been widely used for year in both medical and dental applications. In dentistry, for instance, plastics are used in a broad range of materials and appliances, including removable dentures, temporary crown and bridge materials, restorative materials, impression materials, and the like. They also find many applications in medicine, such as surgical and body implants and other prosthetic devices; heart valves, blood vessels, etc. Translucent plastics are also widely used in medical appliances, such as catheters.

The desirability of imparting radiopacity to plastics used in dentistry and medicine has been recognized. In dentistry, for example, it has been difficult to detect secondary caries or underlying decalcified dentin resulting from the placement of unreinforced direct restorative resins because these materials are relatively radiolucent, and are not opaque to x-rays. Surveys have also shown that dental instruments, materials and non-fixed appliances become embedded in soft tissues, and also become ingested or inhaled inadvertently by patients Although incidences of ingestion or inhalation of dental plastics are relatively rare compared with other foreign objects, the occurrence may result in a severe medical emergency or even death. The potential severity of such an incident makes it imperative to diagnose and remove such foreign bodies rapidly.

In medicine, hip joint replacements require cementing. Therefore, it would be desirable to monitor the positioning of bone cement without surgical procedure. Similarly, the ability to monitor by x-ray replacement heart valves, arteries, including the path of catheters traversing blood vessels and organ systems would be desirable. Hence, there is a need for polymeric materials with increased radiation absorption potentials which also possess the requisite properties for safe and acceptable use in dentistry and medicine.

Heavy metal salts, like the salts of barium, and particularly barium sulfate, have long been used as contrast medium in diagnostic radiography. It has properties which would suggest its suitability for increasing the radiation absorption potential of medical and dental resins. As a result, substantial effort has been made to incorporate barium sulfate and other barium salts, like barium bromide, barium chloride, barium fluoride, barium nitrate, etc., into polymers to render them opaque to x-rays. However, earlier radiopaque polymers containing barium have not been totally satisfactory. Barium based radiopaque materials fall into two principal groups; radiopaque glasses containing imbedded barium metal, and polymers mixed with barium salts. In the case of barium imbedded into radiopaque glasses, the barium is not molecularly bound to the polymer matrix, and therefore, has a tendency to weaken the composite. Moreover, because glass filler based resins lack homogeneity a further weakening of regions in the matrix results. Those regions of a composite having little or no glass are radiolucent. In addition, a light scattering effect is produced by radiopaque glasses which alters optical properties.

Heretofore, polymers with added inorganic barium salts were essentially physical mixtures, present as fine powders locked in a matrix. Their preparation resulted in an uneven distribution of the salt, and had an adverse affect on the mechanical properties of the plastic material. The salt gradually leached out of the matrix causing discoloration of the polymer and release of heavy metal toxins. The salt and polymer remained as separate heterogeneous phases producing an opaque, cloudy material which scattered light. Mixing does not impart homogeneity between the salt and polymer.

Examples of heterogeneous barium salt containing polymers are disclosed by E. C. Combe in the *Dental Practioner*, 51–54 (1971); *Journal of Dental Research Supplement*, Vol. 50, 1192 (1971); *Journal of Dentistry*, Vol. 1, 93–97 (1972); *British Dental Journal*, 355–358 (1969); *Journal of Dental Research*, 668, (May–June 1971). Combe reported in the Dental Practioner, Dental Research and Dental Research Supplement Supra the preparation of poly (barium acrylate) and methyl methacrylate-barium acrylate copolymers. The polymers were extensively crosslinked by the divalent barium ions. The barium polymers were incorporated into a conventional acrylic dough and heat cured. Combe concluded that the addition of barium-containing polymers downgraded the mechanical properties of his modified test materials. Crosslinking made the barium-containing polymers harder and more brittle causing a reduction in impact strength, and increased the quantity of monomer needed to form a dough of satisfactory consistency. Combe's later work, reported in the Journal of Dentistry, compares the properties of radiopaque denture base materials prepared with barium sulfate and barium fluoride mixed with poly (methyl methacrylate). Combe used an organic silane to aid in bonding the barium salts to the acrylic. Heat cured doughs were prepared with polymers having 8 percent w/w barium sulfate, 10 and 20 percent w/w barium fluoride and their mechanical properties tested. Combe concluded that none of the materials containing the barium based polymers were as strong as the unmodified acrylics.

Additional radiopaque contrast media have been formed by the use of (a) other heavy metal salts, such as bismuth, silver, and lead; (b) heavy metals imbedded in silica filler and then added to the resin composition, and (c) the use of highly halogenated polymers. Halogenated polymers or halogenated organic additives, e.g. brominated polymers have good physical properties, but the halogen functional groups tend to hydrolyze or decompose and form leachable compounds. This is especially pronounced in acidic aqueous fluids as commonly found in humans. In addition to the potential toxic effects, leaching of bromide and other halogen causes discoloration of the resin which will gradually convert the polymer to a radiolucent material. The halogenated organic additives can also act to decompose the polymer. Accordingly, there is a need for improved barium-containing radiopaque materials where the barium is molecularly bound to the polymer to form clear, homogeneous, nonleachable materials with mechanical properties which are substantially equivalent to those polymers which are free of barium.

BRIEF SUMMARY OF THE INVENTION

The present invention relates to novel radiopaque materials comprising halogenated barium salts homogeneously distributed at the molecular level in a polymer. The polymer-salt complexes include pendant polyether units, such as ethylene oxide grafted to a polymer backbone which may be a homopolymer derived from a single monomer, like an alkyl methacrylate, or a copolymer containing at least two different monomers. The polymer-salt complexes provide permanent radiopacities equal to or greater than pure aluminum; do not adversely affect the mechanical and physical properties of the compositions in which they are used and can be employed in a variety of medical/dental, industrial applications and products such as in diagnostics of biomaterials, e.g. implants, dentures, medical adhesives, sutures, catheters, optically transparent plastics for windows, protective shields for radiation, e.g. x-rays, high energy ultraviolet radiation and the like.

PREFERRED EMBODIMENTS OF THE INVENTION

The radiopaque materials of the present invention comprise barium salt in the form of a homogeneous complex with a polymer. Instead of a physical mixture of barium salt and polymer, which produces an uneven distribution of the salt adversely affecting mechanical and physical properties, according to the present invention a chelating macromer is incorporated into the polymer chain which is capable of chelating the heavy metal barium ions thereby solubilizing the salts in the polymer matrix. The salt now becomes evenly distributed in a sufficiently high concentration to impart good radiopaque properties to the polymer without materially altering its mechanical properties. The chelating monomer in the polymer contains pendant alkylene oxide units, such as ethylene oxide. More particularly, the radiopaque polymers disclosed herein comprise barium ions complexed with polymers formed from repeating macromer units containing polyethylene glycol dimethyl ethers, i.e., glymes or macrocyclic polyethers, i.e. crown ethers. The alkylene oxide units are grafted to a wide range of backbones, including acrylics, styrene and silicons based polymers.

Specifically, barium salts are complexed with polymers having the following repeating macromer units:

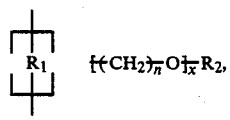
(I)

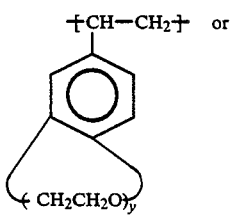
(II)

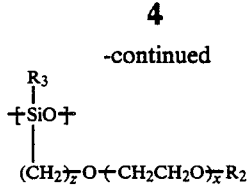
(III)

wherein $R_1$ is acrylate, methacrylate, ethacrylate or styrene; $R_2$ is hydrogen or lower alkyl; $R_3$ is lower alkyl; z is a value from 0-3; n is 2 or 3; x is an integer of at least 8 repeating units and y is an integer of at least 6. In addition, for proper stoichiometry it is preferred that for each barium ion present there are at least 10 alkylene oxide units for complexes containing macromers (I) and (III), and at least 6 alkylene oxide units present for complexes containing macromer (II). The acrylic backbone may include methyl, ethyl, butyl, and 2-ethylhexyl acrylates and methyl, ethyl, butyl, lauryl, stearyl methacrylates and ethacrylates.

More particularly, for the above macromers $R_1$ is acrylate, methacrylate, ethacrylate; $R_2$ is hydrogen, methyl or ethyl; $R_3$ is methyl or ethyl; n is 2 and z is 0 or 2, x is an integer ranging from 8 to about 50, and y is an integer ranging from 6 to about 20.

Styrenated radiopaque polymers containing barium ions complexed with a polymer include repeating macromer units of the formula:

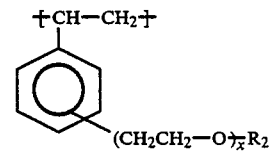

wherein $R_2$ is hydrogen or lower alkyl; x is an integer from 8 to about 50 and for each barium ion present there are at least 10 ethylene oxide units. More specifically, styrenated glymes may be present as isomer mixtures:

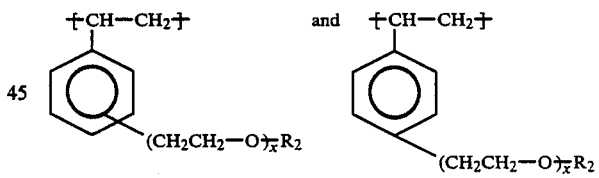

in which $R_2$ is hydrogen, methyl or ethyl; x is an integer of at least 10. The meta and para isomers may be present in a ratio of about 1:2 to about 5:1, and more specifically, a ratio of about 3:2.

Also included in the preferred embodiments of the present invention are silicone based radiopaque polymers having barium ions complexed with glymes of the formula:

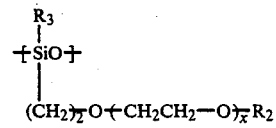

wherein $R_2$ is hydrogen, methyl or ethyl; $R_3$ is methyl, ethyl or propyl, x is an integer of at least 8 and for each barium ion present there are at least 10 ethylene oxide units also present.

The foregoing glymes and crown ethers may also be prepared with comonomers such as acrylonitrile, styrene or an alpha, beta ethylenically unsaturated acid or ester including acrylic acid, methacrylic acid, methyl methacrylate and the like. Mole ratios of comonomer to glyme or crown ether in the polymers may range from about 1:1 to about 25:1.

The glyme and crown ether macromers for preparing the halogenated barium salt complexes described herein include, but are not limited to the following specific representative examples:

Methacrylate-methoxypolyethylene glycol monomethacrylate 1000 daltons

Methacrylate-methoxypolyethylene glycol monomethacrylate 400 dalton

Stearyl-methoxypolyethylene glycol monostyrene 1000 daltons Poly[methoxyhexa(oxyethylene ethoxy)]-methyl siloxane 4'-vinylbenzo-18 crown 6

To achieve true homogeneity at the molecular level the barium salts, including halogenated salts like barium bromide and barium iodide in the polymer salt complexes should be soluble in the macromers or preformed polymers. In this regard, it was found that true anhydrous barium salts are insoluble in both the macromers and preformed polymers, previously disclosed. However, hydrated barium salts were found to be soluble in the macromers and polymers. Therefore hydrated salts like monohydrates and dihydrates of barium bromide and barium iodide are preferred. Although not wishing to be held to an exact mechanism of action, it is nevertheless believed the formation of the desired chelated complexes can be attributed to an interaction between the water of hydration of the barium halide salts and the etherial oxygens in the glymes and crown ethers, in addition to barium-ethylene oxide bonds.

In addition to the water of hydration, the radiopaque polymers preferably have minimum levels of alkylene oxide units per part of barium to form nonleachable chelated complexes. More particularly, it was discovered that the minimum number of repeating alkylene oxide units in a chain for glyme based polymers be at least 8, and more specifically, from 8 to about 50, and at least 6 in the case of crown ethers. However, in order to form clear, homogeneous films free of uncomplexed barium bromide there should be for each hydrated barium bromide present at least 10 alkylene oxides for glymes and at least 6 alkylene oxides for crown ethers. Barium bromide-glyme complexes having ethylene oxide-barium ratios of below 10:1 are cloudy or whitish indicating the presence of uncomplexed barium bromide monohydrate crystallites.

To form barium polymer complexes having a level of radiopacity equivalent to aluminum and also have a fully complexed homogeneous system the minimum amount of barium salt in the glyme or crown ether polymer will range from about 10 to about 40 percent by weight based on total polymer. Hence, for each barium ion present in a glyme homopolymer, for instance, having an average number of 10 ethylene oxide units, the minimum level of barium bromide which should be present to impart radiopacity equal to aluminum will be about 20 percent by weight based on total polymer. A barium polymer complex, for example, formed from a glyme having 22 ethylene oxide units copolymerized with methyl methacrylate will require at least 19.5 percent by weight barium bromide to have a radiopacity equivalent to aluminum.

As previously disclosed, the optically lucent barium salt radiopaque materials of the present invention are homogeneously distributed and chelated with the polymer at the molecular level, and therefore, the complexed barium is virtually nonleachable from the resin. Optionally, however, the present invention also contemplates the addition of minor amounts of crosslinking agents ranging from about 1 to about 15 percent by weight. This will provide even greater resistance to leaching of the barium salts from the polymer. Suitable representative crosslinking agents include tetraethylene glycol dimethacrylate, ethylene dimethacrylate, bisphenol-A-glycidyl methacrylate and the like.

The radiopaque polymeric materials have molecular weights generally ranging from 10,000 to about 500,000, and more specifically, from about 25,000 to about 300,000.

The preparation of solid polymer-electrolyte complexes of polyacrylates carrying pendant oligo-oxyethylene (glyme) chains was reported by Xia et al, *Journal of Polymer Science, Polymer Letters Edition*, Vol. 22, 617–621 (1984). Nonradiopaque polymersalt complexes were prepared with sodium thiocynate, sodium triflate and with lithium chloride, lithium perchlorate and lithium triflate and were used for semiconductant experimentation. The polymers had a $CH_3(OCH_2CH_2)_n$ moiety attached to the ester function of a polymethacrylate backbone. Homopolymers were prepared from three methacrylate glyme monomers, $CH_2=C(CH_3)COO(CH_2CH_2O)_nCH_3$ where the average number of ethylene oxide units was 4, 8 and 22.

According to the present invention polymerization of the glyme-containing macromers can be performed radically with initiators like benzoyl peroxide or azobisisobutyronitrile (ABIN); in bulk or by solution polymerization, for example, in benzene to form high molecular weight polymers (50,000–300,000). The macromers may also be polymerized anionically to form "living" polymers. Radical copolymerization can be performed with a variety of monomers, such as styrene, acrylate esters, etc. Block copolymers of styrene or methyl methacrylate with glyme monomer can be prepared anionically using methods know in the art.

The foregoing crown ether macromers, 4'-vinylbenzo-3n-crown-n ethers, containing at least six ethylene oxide units, i.e. 4'-vinylbenzo-18-crown-6, have ring sizes ranging from 18 to about 30 atoms, or in other words, from 6 to about 10 ethylene oxide units. Monomers like 4'-vinylbenzo-18-crown-6 have been reported by Kopolow, S. et al, *Macromolecules*, 1973, 6, 133; Kikukawa, K. et al, *Bull. Chem. Soc. Japan*, 1977, 50, 2207; *Chemical Abstracts*, 1981, 95, 97762x. Generally, crown ethers are prepare starting from catechol by acylation of the corresponding benzo-3n-crown-n ether, subsequent reduction of the acyl group and dehydration of resulting alcohols in pyridinium p-toluene sulphonate.

The silicone macromers of the present invention when z is two are prepared by refluxing a solution of polydimethyl siloxane in THF with a small excess, in relation to hydrogens on the siloxane, of vinyl glyme having 8 ethylene oxide units in the presence of a minor amount of a platinum divinyl tetramethyl disiloxane complex catalyst. When z is zero, for example, the platinum catalyst is replaced with zinc octoate.

Incorporation of barium may be performed, for instance, by film casting methods from aqueous or organic solvent systems, e.g. methanol or other common solvents like acetonitrile, where the hydrated barium salt and poly glyme or poly crown ether are first dissolved, mixed, cast as a film and the solvent allowed to slowly evaporate. In the case of copolymers with methyl methacrylate or styrene, methanol should be replaced with 1:1 mixtures of ethanol and water. Alternatively, hydrated barium salts can be complexed with the polymer by first dissolving in the glyme or crown ether monomer with or without comonomers and polymerized by bulk or other known methods in the presence of an initiator like ABIN or benzoyl peroxide.

Crosslinking agents may be added to form networks as an additional safeguard against possible leaching when the radiopaque materials are exposed to aqueous solutions. Further methods for safeguarding against potential leaching include encapsulation or forming interpenetrating networks with the radiopaque barium polymer complexes by first grinding the complex into a fine powder and swelling in monomers like those commonly used in dentistry, such as methyl methacrylate or bisphenol-A-glycidyl methacrylate (BISGMA). A slurry is then formed and polymerized in the presence of an initiator like ABIN at 65° C. or at ambient temperature with a benzoyl peroxide-dimethylamino toluene system.

As previously mentioned, the radiopaque barium polymer complexes have a wide variety of dental and medical applications, including industrial uses. In the dental and medical fields, the radiopaque polymers may be employed in applications normally calling for acrylic polymers and vinyl-acrylic copolymers. This would include resin systems having low levels of crosslinking which for purposes of the present invention range from 0 to about 5 percent and denser more rigid structures having a higher degree of crosslinking ranging from more than 5 to about 15 percent. Such systems include "self-curing" type resins which react at ambient temperatures of between 25° and 30° C., and systems which cure at elevated temperatures of about 65° to about 100° C. with the application of heat.

Generally, for preparing radiopaque biomedical resins, i.e. polymer compositions having useful applications in dentistry and medicine, the barium polymer complex would be ground to a fine powder and used as a component of a two part system. More specifically, in the two part system the composition is furnished in two separate containers. The first container comprises a powder containing a mixture of the radiopaque barium polymer complex previously described, polymethyl methacrylate or other translucent acrylic resin and initiator like benzoyl peroxide or ABIN. The second container comprises a liquid containing methyl methacrylate monomer or BISGMA, a crosslinking agent like ethylene dimethacrylate and an accelerator, such as N,N-dehydroxyethyl p-toluidine. When the solutions are mixed the barium polymer complex will swell in the methyl methacrylate monomer and the composite will polymerize into a solid homogeneous polymer mass. If desired, the usual fillers and dyes can be added to the composite to suit a particular need.

Applications for the barium polymer complexes having low levels of crosslinking include removable devices like dentures, partial dentures, bite splints, night guards, orthodontic space maintainers, maxillofacial devices and other nonfixed devices where there is risk of accidental impaction into the respiratory or digestive tracks. Those barium polymer complexes, having low levels of crosslinking, can also be formulated into bone cements for bonding implanted devices to bone tissues thereby permitting monitoring by noninvasive methods.

The second category of biomedical resins include highly crosslinked structures where radiopacity is also a desirable property. They include fixed structures like restorative resins, veneering facings for dental crowns and bridges, dental and surgical implants, root canal sealants and other dental, surgical and implant applications. These materials are generally provided to the user as either two-part systems that cure at ambient temperatures upon mixing, or as a one-component system which cures upon the application of an external source of energy, mainly light, (U/V and/or visible). In the two-part system one part contains an initiator and the other part contains an accelerator similar to those used in the low-crosslinking resins. In the highly crosslinked structures, however, no preformed polymer is used. Instead, each component consists of a solution of monomers. Many of such applications can also employ a hard, inert reinforcing "filler" consisting of a finely divided material such as silica.

In addition to the foregoing medical applications, the radiopaque barium polymer complexes may be used with all body implants and appliances which are presently used with radiolucent plastics, such as catheters, bone implants, heart valves, arteries, etc. Industrial applications for the radiopaque complexes of the present invention include x-ray and other radiation shielding devices. Optionally, the clear, transparent radiopaque polymers, which are also opaque to U/V radiation, can be used in such areas as aircraft windows and cabins for shielding pilots and astronauts from high energy U/V and x-radiation found at high altitudes. Transparent shielding devices made of sheets of radiopaque polymethyl methacrylate for workers exposed to x-rays and other forms of potentially harmful radiation are also intended utilities.

The following specific examples demonstrate the radiopaque polymers, resin compositions and products made therefrom according to the present invention. However, it is to be understood that these examples are for illustrative purposes only and do not purport to be wholly definitive as to conditions and scope.

EXAMPLE I

Part A

Polymethoxypolyethylene glycol monomethacrylate containing an average number of 22 ethylene oxide units was prepared from the corresponding monomer available under the trademark MG-22 from Polysciences, Inc., Warrington, Pa.

MG-22 monomer was polymerized in a 20 percent solution of benzene containing 0.5 percent by weight ABIN initiator.

Polymerization was performed in an ampoule; degassed to 1 mm of mercury; the reactor sealed and heated to 65° C. for 48 hours. The homopolymer was then precipitated in hexane. Any unreacted monomer was remove by ultrafiltration in water. Water was removed from the polymer by rotary evaporation, azeotropically with benzene, and finally freeze-dried from benzene. The polymer can also be polymerized in water at elevated temperatures in the presence of redox systems e.g. 0.5M $K_2SO_4$+$FeCl_2$.

Part B

In the preparation of barium bromide glyme 22 complexes, the ethylene oxide:barium ratio is the ratio of ethylene oxide units (22 per glyme monomer) to barium bromide units. The relationship between this ratio and other possible ratios are given below in Table I.

TABLE I

| Ethylene Oxide: $BaBr_2.H_2O$ | Glyme 22: $BaBr_2.H_2O$ | $BaBr_2$ by Weight | $BaBr_2$ by Molar % | Complex |
|---|---|---|---|---|
| 4:1 | 1:5.5 | 59.77% | 84.62% | 1* |
| 6:1 | 1:3.67 | 49.76% | 78.57% | 1 |
| 8:1 | 1:2.75 | 42.62% | 73.34% | 1 |
| 10:1 | 1:2.2 | 37.28% | 68.75% | 2* |
| 16:1 | 1:1.375 | 27.08% | 57.89% | 2 |
| 22:1 | 1:1 | 21.26% | 50% | 2 |
| 44:1 | 2:1 | 11.90% | 30.333% | 2 |

*1 ... free, uncomplexed salt present
*2 ... fully complexed salt present

The complexes in Table I were each formed in 3 ways: (1) casting a film from methanol, (2) casting a film from $H_2O$, (3) bulk polymerization.

(1) Casting a film from methanol - barium bromide and poly glyme 22 were dissolved in methanol and mixed for several hours. They were then cast as a film and the methanol was allowed to evaporate very slowly under $N_2$ for 48 hours. The samples were then placed under 1 mm vacuum to remove any remaining methanol. The samples 10:1, 22:1, and 44:1 were clear films while the 8:1, 6:1, and 4:1 were whitish with crystallites present. The crystallites are attributed to free, uncomplexed barium bromide in the complexes with greater salt concentration than 10:1 ethylene oxide:barium.

(2) Casting a film from $H_2O$ barium bromide monohydrate and poly glyme 22 were dissolved in distilled $H_2O$ and mixed for several hours. Films were cast and the $H_2O$ was allowed to evaporate slowly for 48 hours in the hood. The samples were then placed under 1 mm of vacuum to remove any remaining water. The 10:1, 16:1, 22:1 and 44:1 samples were clear and homogeneous. The 4:1, 6:1 and 8:1 samples were whitish with crystallites present.

(3) Bulk polymerization - barium bromide and glyme 22 monomer were placed in a test tube equipped with a serum cap and allowed to stir for 2 hours at 50° C. The salt dissolved in the 16:1, 22:1 and 44:1 samples but in the 10:1, 8:1, 6:1 and 4:1 samples there was too much salt present for it all to dissolve. To the 16:1, 22:1 and 44:1 samples 0.5 percent by weight of the monomer, ABIN was added and the solution purged with $N_2$ and sealed. Polymerization took place at 65° C. for 48 hours resulting in a clear to cloudy homogeneous polymer.

Part C

The polymer salt complexes in powder form were pressed into 1 mm pellets and placed on Kodak x-ray film along with an aluminum stepwedge with 1 mm steps. The film was placed 22 inches below the cathode ray tube of an x-ray apparatus and exposed to 60 KV, 6 mas x-rays. The amount of x-rays absorbed were compared with the aluminum stepwedge. A microfilm densitometer was used to determine and compare the x-ray absorption. It required 19.5 percent by weight barium bromide monohydrate in a 1 mm pellet to be as radiopaque as aluminum. If lower or higher radiopacity is needed the salt content can be adjusted. The final complex consisted of 30 percent by weight glyme 22 and 50 percent by weight methyl methacrylate in the copolymer and 20 percent by weight barium bromide monohydrate. It has a radiopacity equal to aluminum yet retains good mechanical properties.

EXAMPLE II

Glyme 22 can be copolymerized with methyl methacrylate in the presence of ABIN to form a copolymer which can complex with barium bromide monohydrate. To obtain a barium bromide content in the copolymer of 19.5 percent by weight so that it can be as radiopaque as aluminum, a ratio of 10 ethylene oxides:1 barium is used to avoid free salt in the copolymer. To obtain a copolymer with the highest percent of methyl methacrylate, lowest percent of glyme and still maintain homogeneity and radiopacity equal to aluminum the following stoichiometric amounts are suggested: 20 units of methyl methacrylate : 1 unit of glyme: 2.2 units of barium bromide which is equivalent to: 11.51 mole % barium bromide; 5.23 mole % glyme; 83.25 mole % methyl methacrylate or 19.5% by weight barium bromide; 32.8% by weight glyme an 47.9% by weight methyl methacrylate.

EXAMPLE III

A crown ether-methyl methacrylate copolymer was prepared by reacting for each crown ether 10 methyl methacrylates in the monomer feed. This provided a copolymer of 1 crown for every 9.35 methyl methacrylates. The copolymerization was performed in a 20 percent solution in benzene with 0.5 percent by weight ABIN and at 1 mm pressure. In the copolymer we found by NMR one repeat unit of crown for every 9.35 repeat units of methyl methacrylate. One barium bromide will complex in the ratio 6 ethylene oxides:1 barium with an 18 crown 6 ligand. Therefore, at maximum 1 unit of barium bromide will complex with every one unit of crown ether and 9.35 units of methyl methacrylate.

To form a film, dissolve (1.3 g) of the copolymer in an ethanol water mixture with barium bromide monohydrate (0.315 g) and evaporate the solvent slowly to provide a barium polymer complex:
19.50 percent barium bromide monohydrate by weight
22.65 percent crown either by weight
57.85 percent polymethyl methacrylate by weight
or a mole ratio of 1 mole barium bromide monohydrate:1 mole 18 crown 6:9.35 moles of methyl methacrylate. The copolymer has a radiopacity equal to aluminum.

EXAMPLE IV

A silicone-ethylene oxide graft polymer is prepared from a percent by weight solution of polymethylsiloxane in 250 ml of THF. A 5 percent excess of Carbowax (8 ethylene oxide units) is added in relation to hydrogens on the siloxane. 0.01 ml of platinum divinyl tetramethyl disiloxane complex is added to the reaction mixture as catalyst. The reaction mixture is refluxed for 24 hours; precipitated in a solution of 90 percent hexane and 10 percent THF. The polymer is dissolved in ethanol and unreacted Carbowax removed by ultrafiltration to provide better than 99 percent substitution. Barium bromide monohydrate is then dissolved in an ethanol solution containing the polymer. The solution should contain no more than one barium ion for every ten ethylene oxide units. The solvent is slowly evaporated.

EXAMPLE V

A biomedical resin composition according to the present invention is prepared from a radiopaque barium polymer complex powder containing on a percent by weight basis barium bromide 20 percent; glyme homopolymer such as PMG-22 30 percent and polymethyl methacrylate 50 percent. One weight equivalent of radiopaque polymer powder is blended with initiator like benzoyl peroxide and stirred with one weight equivalent of methyl methacrylate monomer. About 5 percent ethylene dimethacrylate or other crosslinking agent and N, N-dihydroxy-ethyl p-toluidine or other accelerator is incorporated into the radiopaque polymer-initiator-monomer mixture. After a few minutes the solution turns into a dough-like material due to polymerization of the composition. It is then placed into a gypsum mold where it is allowed to cure. Because the final biomedical resin composition is diluted with radiolucent methyl methacrylate it would be one-half as radiopaque as aluminum. If higher radiopacities are desired which are equivalent to aluminum, the radiopaque polymer can be modified by increasing the barium bromide content to 40 percent and 60 percent glyme homopolymer in the initial powder.

EXAMPLE VI

A catheter is prepared with a molding composition containing the siloxane homopolymer of Example IV. A resin composition is prepared according to Example V except that the barium-siloxane polymer complex is used as the radiopaque polymer in place of the barium-PMG-22 complex because it will impart elasticity to the final molded product. A less flexible prosthetic device can be prepared with a carbon backbone based polymer powder.

EXAMPLE VII

A translucent radiopaque device for shielding x-rays can be prepared with a barium polymer complex containing 19.5 percent by weight barium bromide monohydrate; 32.8 percent by weight methoxypolyethyleneglycol monomethacrylate monomer having 22 ethylene oxide units (MG-22) and 47.9 percent methyl methacrylate monomer. A film of the polymer complex is formed by casting from a 1:1 ethanol-water mixture containing the monomers mixed with the barium bromide, also dissolved in a 1:1 ethanol water mixture. The solvent is very slowly removed under a stream of nitrogen to produce a clear, transparent film. To form a shielding film with a radiopacity equivalent to 1 mm of aluminum the film should also be 1 mm in thickness.

While the invention has been described in conjunction with examples thereof, this is illustrative only. Accordingly, many alternatives, modifications and variations will be apparent to persons skilled in the art in light of the foregoing description, and it is therefore intended to embrace all such alternatives, modifications and variations as to fall within the spirit and broad scope of the appended claims.

We claim:

1. A homogeneous, optically transparent radiopaque polymer comprising barium ions of a hydrated barium salt molecularly bound to a polymer comprising repeating macromer units selected from the group consisting of:

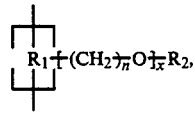
(I)

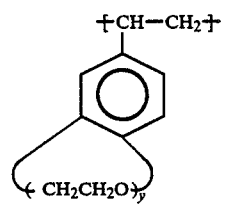
and

(III)

wherein $R_1$ is acrylate, methacrylate, ethacrylate or styrene; $R_2$ is hydrogen or lower alkyl; $R_3$ is lower alkyl; z is from 0 to 3; n is 2 or 3, x is an integer of at least 8; y is an integer of at least 6 and for each barium ion present there are at least 10 alkylene oxide units present for polymers containing I or III and at least 6 ethylene oxide units present for polymers containing II, said barium being virtually nonleachable from the polymer.

2. The radiopaque polymer of claim 1 wherein the barium ions of the hydrated barium salt are complexed with a polymer comprising repeating macromer units of the formula:

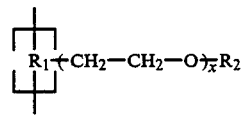

wherein $R_1$ is selected from acrylate, methacrylate or ethacrylate; $R_2$ is hydrogen, methyl or ethyl; x is an integer ranging from 8 to about 50 and for each barium ion present there are at least 10 ethylene oxide units.

3. The radiopaque polymer of claim 2 wherein the barium ions of the hydrated barium salt are complexed with a polymer comprising repeating macromer units of the formula:
is methacrylate, $R_2$ is methyl; x is an integer of at least 8 and for each barium ion present there are at least 10 ethylene oxide units.

4. The radiopaque polymer of claim 1 wherein the barium ions of the hydrated barium salt are complexed with a polymer comprising repeating macromer units of the formula:

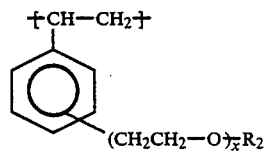

in which $R_2$ is hydrogen or lower alkyl; x is an integer of at least 8 and for each barium ion present there are at least 10 ethylene oxide units.

5. The radiopaque polymer of claim 4 wherein the barium ions of the hydrated barium salt are complexed with a polymer comprising mixture of repeating macromers of the formulas:

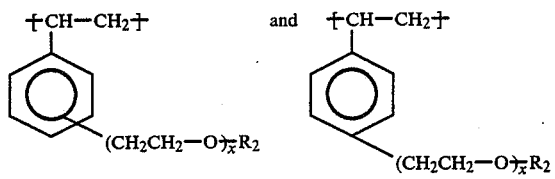

in which $R_2$ is hydrogen, methyl or ethyl and $x$ is an integer of at least 8 and for each barium ion present there are at least 10 ethylene oxide units.

6. The radiopaque polymer of claim 1 wherein the barium ions of the hydrated barium salt are complexed with a polymer comprising repeating macromer units of the formula:

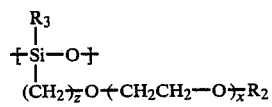

in which $R_2$ is hydrogen, methyl or ethyl; $R_3$ is methyl or ethyl, $z$ is 2 and $x$ is an integer of at least 8, and for each barium ion present there are at least 10 ethylene oxide units.

7. The radiopaque polymer of claim 1 wherein the barium ions of the hydrated barium salt are complexed with a polymer comprising repeating macromer units of the formula:

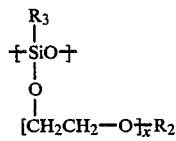

in which $R_2$ is hydrogen, methyl or ethyl; $R_3$ is methyl; $x$ is an integer of at least 8, and for each barium ion present there are at least 1 ethylene oxide units.

8. The radiopaque polymer of claim 1 wherein the barium ions are derived from salts selected from monohydrates and dihydrates of barium bromide an barium iodide.

9. The radiopaque polymer of claim 1 wherein the barium ions of the hydrated barium salt are complexed with a polymer comprising repeating macromer units of the formula:

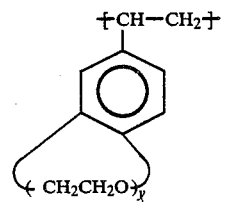

wherein $y$ is an integer of at least 6 and for each barium ion present there are at least 6 ethylene oxide units present.

10. The radiopaque polymer of claim 1 including a comonomer selected from styrene, acrylonitrile or an alpha, beta ethylenically unsaturated acid o ester.

11. The radiopaque polymer of claim 3 including a comonomer selected from styrene, acrylonitrile or an alpha, beta ethylenically unsaturated acid or ester.

12. A biomedical resin containing composition comprising a radiopaque polymer of claim 1.

13. A biomedical resin containing composition comprising the radiopaque polymer of claim 3.

14. A biomedical resin containing composition comprising the radiopaque polymer of claim 4.

15. A biomedical resin containing composition comprising the radiopaque polymer of claim 6.

16. A biomedical resin containing composition comprising the radiopaque polymer of claim 9.

17. A biomedical resin containing composition comprising the radiopaque polymer of claim 10.

* * * * *

UNITED STATES PATENT AND TRADEMARK OFFICE
CERTIFICATE OF CORRECTION

PATENT NO. : 4,866,132
DATED : September 12, 1989
INVENTOR(S) : Alan Obligin et al.

It is certified that error appears in the above-identified patent and that said Letters Patent is hereby corrected as shown below:

Column 12, line 50 (Claim 3) after the expression "the formula:" it should read

Column 12, line 51 (Claim 3) insert --wherein $R_1$-- before "methacrylate,"

Column 14, line 6 (Claim 8) "an" should be --and--.

Column 14, line 27 (Claim 10) "o" should be --or--.

Signed and Sealed this

Seventeenth Day of July, 1990

Attest:

HARRY F. MANBECK, JR.

Attesting Officer

Commissioner of Patents and Trademarks